US006949188B2

(12) United States Patent
Geyer

(10) Patent No.: US 6,949,188 B2
(45) Date of Patent: Sep. 27, 2005

(54) FILTER ASSEMBLY HAVING IMPROVED SEALING FEATURES

(75) Inventor: Frederick J. Geyer, Rensselaer, IN (US)

(73) Assignee: Geyer's Manufacturing & Design, Inc., Winamac, IN (US)

( * ) Notice: Subject to any disclaimer, the term of this patent is extended or adjusted under 35 U.S.C. 154(b) by 344 days.

(21) Appl. No.: 10/195,826

(22) Filed: Jul. 15, 2002

(65) Prior Publication Data

US 2004/0007515 A1 Jan. 15, 2004

(51) Int. Cl.[7] ............................................. B01D 35/30
(52) U.S. Cl. ....................... 210/232; 210/445; 210/450; 210/451; 210/452; 210/453; 210/477; 55/369; 55/373; 55/378; 55/DIG. 26
(58) Field of Search ................................. 210/232, 237, 210/445, 450, 451, 452, 453, 473, 474, 477, 483; 55/369, 373, 378, DIG. 26

(56) References Cited

U.S. PATENT DOCUMENTS

| | | | | | |
|---|---|---|---|---|---|
| 1,352,961 | A | * | 9/1920 | Hills ........................... | 210/452 |
| 1,556,913 | A | * | 10/1925 | Capra .......................... | 210/282 |
| 2,801,764 | A | * | 8/1957 | Russell et al. .............. | 220/320 |
| 3,771,664 | A | * | 11/1973 | Schrink et al. ............. | 210/448 |
| 3,774,769 | A | * | 11/1973 | Smith ......................... | 210/232 |
| 3,931,015 | A | * | 1/1976 | Jenkins ....................... | 210/232 |
| 4,021,354 | A | | 5/1977 | Lyon | |
| 4,133,769 | A | * | 1/1979 | Morgan, Jr. ................ | 210/455 |
| 4,157,964 | A | * | 6/1979 | Rishel ........................ | 210/238 |
| 4,204,966 | A | | 5/1980 | Morgan, Jr. | |
| 4,253,959 | A | * | 3/1981 | Tafara ........................ | 210/232 |
| 4,256,473 | A | * | 3/1981 | De Martino ................ | 55/379 |
| 4,259,188 | A | * | 3/1981 | Morgan ...................... | 210/448 |
| 4,276,070 | A | * | 6/1981 | Hug ............................ | 55/429 |
| 4,283,281 | A | * | 8/1981 | Cogan ........................ | 210/232 |
| 4,285,814 | A | | 8/1981 | Morgan, Jr. | |
| 4,388,191 | A | * | 6/1983 | Morgan ...................... | 210/452 |
| 4,390,425 | A | * | 6/1983 | Tafara et al. ............... | 210/232 |
| 4,419,240 | A | * | 12/1983 | Rosaen ....................... | 210/444 |
| 4,460,468 | A | | 7/1984 | Morgan | |
| 4,552,661 | A | * | 11/1985 | Morgan ...................... | 210/232 |
| 4,648,889 | A | * | 3/1987 | Jensen ........................ | 55/341.2 |
| 4,669,167 | A | * | 6/1987 | Asterlin ...................... | 29/426.6 |
| 4,701,259 | A | * | 10/1987 | Rosaen ....................... | 210/450 |
| 4,721,563 | A | * | 1/1988 | Rosaen ....................... | 210/85 |
| 4,775,469 | A | * | 10/1988 | Zimmerly ................... | 210/237 |
| 4,818,398 | A | * | 4/1989 | Lott et al. ................... | 210/238 |
| 4,948,504 | A | * | 8/1990 | Kierdorf et al. ............ | 210/238 |
| 4,966,697 | A | * | 10/1990 | Rosaen ....................... | 210/232 |
| 5,006,243 | A | * | 4/1991 | Arnaud ....................... | 210/232 |
| 5,039,410 | A | | 8/1991 | Gershenson | |
| 5,075,004 | A | * | 12/1991 | Gershenson et al. ....... | 210/445 |
| 5,137,632 | A | * | 8/1992 | Morgan, Jr. ................ | 210/445 |
| 5,186,828 | A | * | 2/1993 | Mankin ...................... | 210/232 |
| 5,192,424 | A | * | 3/1993 | Beyne et al. ............... | 210/85 |
| 5,246,581 | A | * | 9/1993 | Goldman .................... | 210/452 |
| 5,279,732 | A | * | 1/1994 | Edens ......................... | 210/232 |

(Continued)

*Primary Examiner*—Robert James Popovics
(74) *Attorney, Agent, or Firm*—Krieg DeVault LLP

(57) ABSTRACT

A filter assembly including a filter housing defining an interior chamber with an open end, a filter disposed within the interior chamber, and a cover removably positioned over the open end to enclose the interior chamber. The filter housing defines an axially-facing sealing surface spaced from the open end. The filter includes a filter element and a flange element, with the flange element having a hook-shaped lip portion defining an axially-facing groove adapted to securely retain an O-ring seal therein. The cover includes an axially-extending sidewall portion and a laterally-extending flange portion, with the sidewall portion defining an outward taper adapted to retain an O-ring seal thereon. A clamp is used to bias the cover into sealing engagement with the open end of the filter housing. The cover in turn biases the flange element of the filter into sealing engagement with the axially-facing sealing surface of the filter housing.

37 Claims, 4 Drawing Sheets

U.S. PATENT DOCUMENTS

| | | | | |
|---|---|---|---|---|
| 5,290,441 A | * | 3/1994 | Griffin et al. | 210/232 |
| 5,358,638 A | * | 10/1994 | Gershenson | 210/448 |
| 5,376,271 A | * | 12/1994 | Morgan, Jr. | 210/450 |
| 5,441,650 A | * | 8/1995 | Kirsgalvis | 210/767 |
| 5,462,678 A | * | 10/1995 | Rosaen | 210/798 |
| 5,514,275 A | * | 5/1996 | Morgan, Jr. | 210/448 |
| 5,624,559 A | * | 4/1997 | Levin et al. | 210/447 |
| 5,840,188 A | * | 11/1998 | Kirsgalvis | 210/448 |
| 5,989,421 A | * | 11/1999 | Davis et al. | 210/232 |
| 6,116,429 A | | 9/2000 | Kirsgalvis | |
| 6,136,192 A | * | 10/2000 | Booth et al. | 210/450 |
| 6,245,130 B1 | * | 6/2001 | Maybee et al. | 95/286 |
| 2004/0007515 A1 | * | 1/2004 | Geyer | 210/232 |

* cited by examiner

FILTER ASSEMBLY HAVING IMPROVED SEALING FEATURES

FIELD OF THE INVENTION

The present invention generally relates to filter assemblies for use in the field of liquid filtration, and more specifically relates to a filter assembly having improved sealing features.

BACKGROUND OF THE INVENTION

Various types and configurations of filter assemblies are used in the field of liquid filtration to remove solid materials or contaminants from a liquid flow. Filter assemblies typically include a removable/replaceable filter element, such as a bag or basket, disposed within a filter housing. The filter housing includes inlet and outlet ports that direct liquid flow into and out of the filter housing and through the filter element. Since the filter element must be periodically inspected, cleaned and/or replaced, the filter housing is usually equipped with a removable lid or cover. A significant concern regarding the design of these types of filter assemblies is the ease and timeliness in which the filter element can be accessed for maintenance. In most cases, access to the filter element requires by-passing or shutting off fluid flow to the filter assembly. It is therefore advantageous to minimize the time required to access, clean and/or replace the filter element to minimize system down time and to reduce maintenance costs.

Filter assemblies of the above-discussed type usually require a seal or gasket disposed between the filter element and the filter housing to provide a liquid-tight seal between the unfiltered liquid and the filtered liquid. A seal or gasket is also usually required to provide a liquid-tight seal between the main body of the filter housing and the filter housing lid. As discussed above, periodic maintenance of the filter assembly requires removal of the filter housing lid and typically requires complete removal of the filter element from the filter housing. During removal of the filter housing lid and the filter element, the seals or gaskets may become inadvertently or unintentionally dislodged from the filter assembly. As a result, the seals or gaskets may be lost or damaged. The seals or gaskets may also fall into the filter housing and/or the fluid outlet port, thereby requiring a time-consuming and potentially costly retrieval process to avoid contamination of the outlet fluid flow. Additionally, if the seals or gaskets become dislodged from the filter assembly, they must be reinstalled prior to start-up, thereby tending to increase maintenance time and associated labor costs.

Thus, there is a general need in the industry to a filter assembly having improved sealing features. The present invention satisfies this need and provides other benefits and advantages in a novel and unobvious manner.

SUMMARY OF THE INVENTION

The present invention is directed to a filter assembly having improved sealing features. While the actual nature of the invention covered herein can only be determined with reference to the claims appended hereto, certain forms of the invention that are characteristic of the preferred embodiments disclosed herein are described briefly as follows. However, it should be understood that other embodiments are also contemplated as falling within the scope of the present invention.

In one form of the present invention, a filter assembly is provided which includes a filter housing defining an interior chamber extending along an axis and having an open end. The filter housing also defines an axially-facing sealing surface. A filter is disposed within the interior chamber of the filter housing and includes a filter element and a flange element, with the flange element having a hook-shaped lip portion defining an axially-facing groove adapted to securely retain a seal therein. A cover is removably positioned over the open end of the filter housing to enclose the interior chamber.

In another form of the present invention, a filter assembly is provided which includes a filter housing defining an interior chamber extending along an axis and having an open end. A filter is disposed within the interior chamber of the filter housing. A cover is removably positioned over the open end of the filter housing to enclose the interior chamber. The cover includes an axially-extending sidewall portion and a laterally-extending flange portion extending outwardly therefrom, with the sidewall portion defining an outward taper relative to the flange portion to retain a seal thereon.

In yet another form of the present invention, a filter assembly is provided which includes a filter housing defining an interior chamber extending along an axis and having an open end. The filter housing also defines an axially-facing annular sealing surface spaced from the open end. A filter is disposed within the interior chamber of the filter housing and includes a filter element and an annular flange element. A first seal is disposed between the annular flange element and the annular sealing surface of the filter housing. A cover is removably positioned over the open end of the filter housing to enclose the interior chamber. The cover includes a lid portion and a retainer portion, with the retainer portion defining an annular bearing surface. A second seal is disposed between the lid portion and the open end of the filter housing. A clamp mechanism exerts a biasing force onto the lid portion to provide sealing engagement between the lid portion and the open end of the filter housing. The lid portion cooperates with the retainer portion to engage the annular bearing surface against the annular flange element of the filter to provide sealing engagement between the annular flange element and the annular sealing surface of the filter housing.

It is one object of the present invention to provide a filter assembly having improved sealing features. Further objects, features, advantages, benefits, and aspects of the present invention will become apparent from the drawings and description contained herein.

DESCRIPTION OF THE PREFERRED EMBODIMENTS

Figures 1, 2:
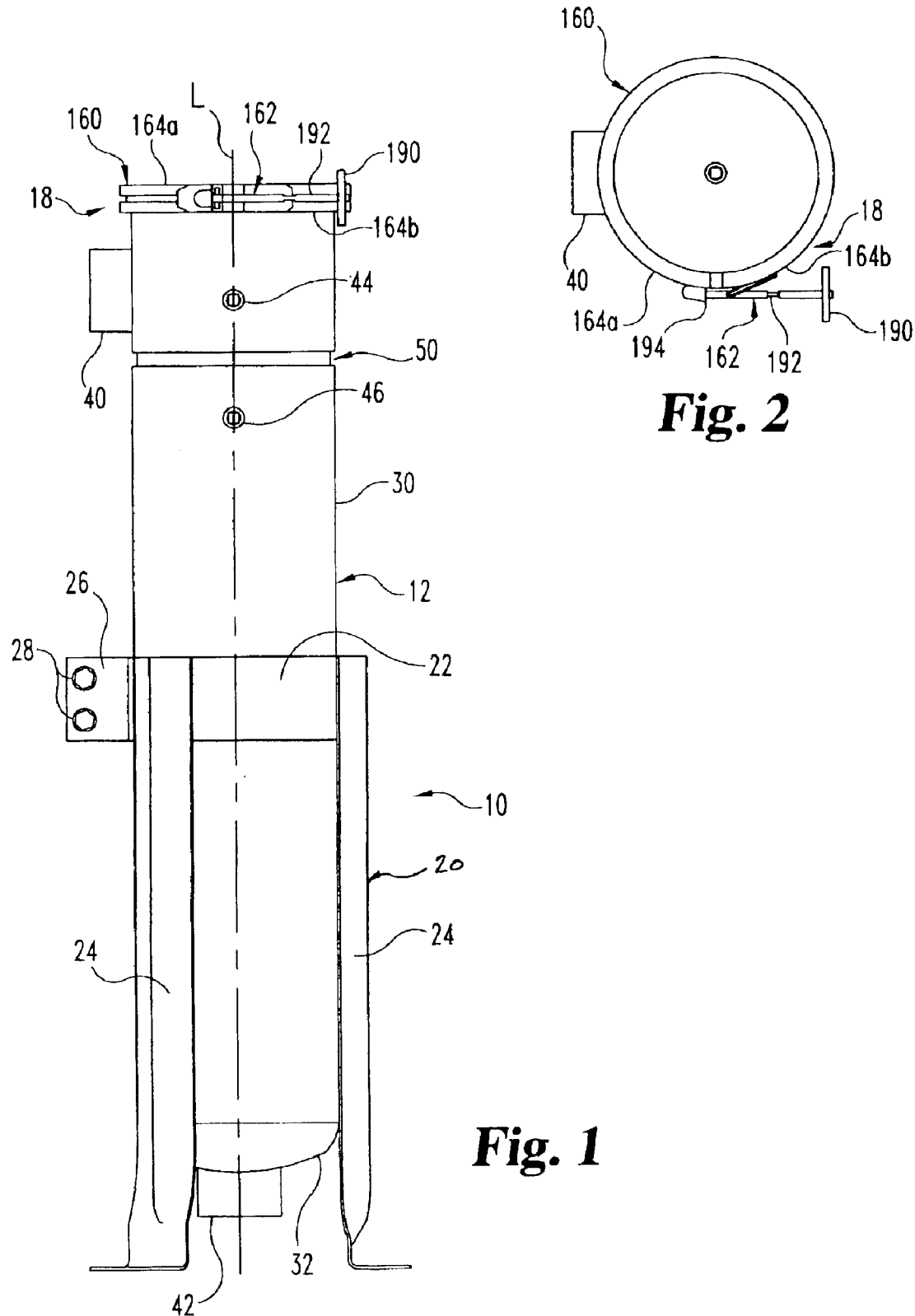
FIG. 1 is a side elevational view of a filter assembly according to one form of the present invention.
FIG. 2 is a top plan view of the filter assembly shown in FIG. 1.

For the purposes of promoting an understanding of the principles of the present invention, reference will now be made to the preferred embodiments illustrated in the drawings and specific language will be used to describe the same. It will nevertheless be understood that no limitation on the scope of the present invention is intended, and any alterations or modifications in the disclosed embodiments and further applications of the principles of the present invention are contemplated as would normally occur to one skilled in the art to which the present invention relates.

Figure 3:
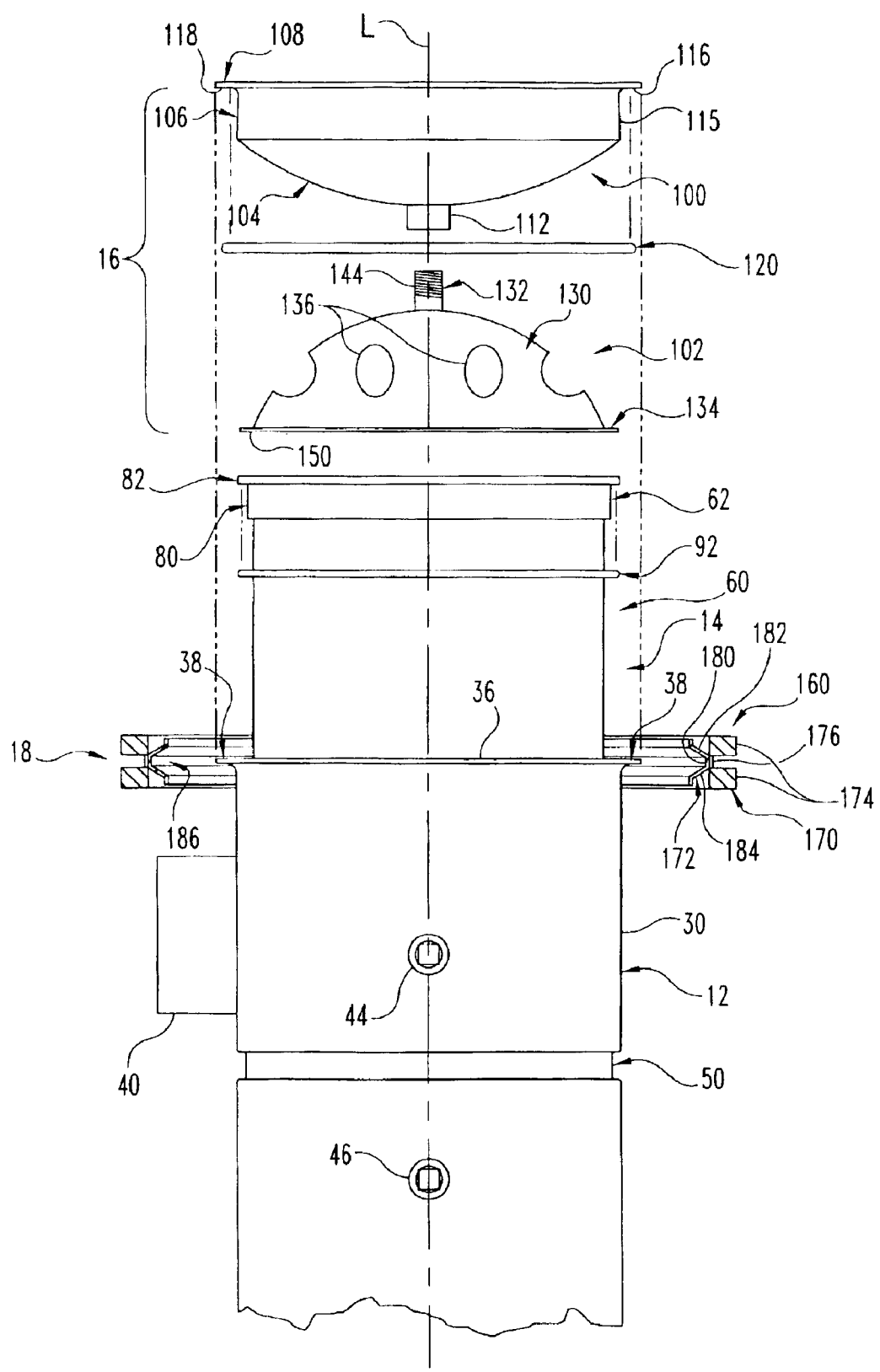
FIG. 3 is an exploded view of the filter assembly shown in FIG. 1.

Referring to FIGS. 1–3, shown therein is a filter assembly 10 according to one form of the present invention. The filter assembly 10 extends along a longitudinal axis L and is generally comprised of a filter housing 12, a filter 14 disposed within the filter housing 12, and a removable cover assembly 16. The cover assembly 16 is removably secured to the filter housing 12 via a clamp mechanism 18. The filter assembly 10 is maintained in an upright position by a support structure 20 operably coupled to the filter housing 12. The support structure 20 includes an annular band or collar 22 extending about the outer surface of the filter housing 12 with three or more axially-extending support legs 24 positioned uniformly about the collar 22. The collar 22 includes a pair of outwardly extending, opposing flanges 26 which are drawn together via one or more fasteners 28 to tightly clamp the collar 22 about the filter housing 12. The support legs 24 may be secured to a substrate, such as concrete flooring, by a number of fasteners to rigidly support the filter assembly 10 in an upright position.

In one embodiment of the invention, the filter housing 12 includes a tubular sidewall 30 and a domed bottom wall 32 cooperating to define a hollow, cylindrical-shaped interior chamber 34 (FIG. 4) having an open end 36. Although the filter housing 12 has been illustrated and described as having a particular shape and configuration, it should be understood that other shapes and configurations are also contemplated. For example, instead of defining a generally cylindrical configuration, the filter housing 12 could define a non-circular cross-section, such as, for example, a square or rectangular cross-section. The filter housing 12 also includes an exterior flange 38 extending outwardly from the sidewall 30 adjacent the open end 36. The flange 38 preferably extends about the entire perimeter of the sidewall 30 so as to define an outwardly-facing annular sealing surface 39. Further details regarding the function of the flange 38 will be discussed below. In one embodiment of the invention, the filter housing 12 is formed of a metallic material, such as, for example, stainless steel or carbon steel. However, other materials are also contemplated, such as, for example, plastic materials including polypropylene, polyethylene, thermoplastic materials, or any other type of filter housing material that would occur to one of skill in the art.

The filter housing 12 also includes a fluid inlet port 40 and a fluid outlet portion 42. In one embodiment, the fluid inlet port 40 extends from the sidewall 30 in a transverse direction adjacent the open end 36 and is disposed in fluid communication with the interior chamber 34. The fluid outlet port 42 extends from the bottom wall 32 in an axial direction and is also disposed in fluid communication with the interior chamber 34. It should be understood, however, that the inlet/outlet ports 40, 42 may be disposed at other locations and at other orientations relative to the filter housing 12. The fluid inlet and outlet ports 40, 42 are configured for engagement with inlet/outlet piping or conduit (not shown) to connect the filter assembly 10 in series with a recirculating fluid flow system, the details of which would be apparent to one of skill in the art. The filter housing 12 also includes a pair of pressure ports 44, 46 communicating with the interior chamber 34, with one of the pressure ports 44 being disposed in fluid communication with the inlet or upstream side of the filter 14 and with the other pressure port 46 being disposed in fluid communication with the outlet or downstream side of the filter 14. One or more pressure sensors or gauges (not shown) may be connected to the pressure ports 44, 46 to measure the fluid pressure differential across the filter 14.

In a preferred embodiment of the invention, the filter housing 12 includes a structural feature that cooperates with the filter 14 to support the filter 14 within the filter housing 12 and to provide a fluid-tight sealing arrangement therebetween, the details of which will be discussed more fully below. In one embodiment of the invention, the filter housing 12 includes a projection or protrusion 50 extending inwardly into the interior chamber 34 to define a lip or shoulder 52. The shoulder 52 in turn defines an axially-facing sealing surface 54 spaced from the open end 36 of the filter housing 12. The axially-facing sealing surface 54 preferably extends about the entire inner periphery of the sidewall 30 so as to define an annular sealing surface. The inward protrusion 50 also defines an axial bearing surface 56 extending from the annular sealing surface 54. In one embodiment of the invention, the inward protrusion 50 formed in the sidewall 30 is C-shaped. However, it should be understood that other shapes and configurations of the protrusion 50 are also contemplated as falling within the scope of the present invention.

In a specific embodiment of the invention, the protrusion 50 is formed integral with the sidewall 30 of the filter housing 12 so as to define a single-piece, unitary structure. The protrusion 50 may be formed, for example, by inwardly deforming a portion of the sidewall 30 to provide an indentation or recess 58 extending annularly about the filter housing 12. Such inward deformation of the sidewall 30 in turn forms the inward protrusion 50 extending into the interior chamber 34, which in turn defines the annular sealing surfaces 54 and the axial surface 56. In one embodiment of the invention, inward deformation of the sidewall 30 is accomplished by heating the sidewall 30 to a temperature sufficient to soften the sidewall material. A concentrated, uniform pressure is then exerted onto an annular band portion of the outer surface of the sidewall 30 to inwardly deform the sidewall material. An internal die or jig may be positioned within the interior chamber 34 to aid in forming the projection 50 into the desired size, shape and configuration.

The filter 14 is disposed within the interior chamber 34 of the filter housing 12 and is generally comprised of a filter element 60 and a flange element 62. The filter 14 has a generally cylindrical configuration corresponding to the size and shape of the interior chamber 34. It should be understood, however, that other shapes and configurations of the filter 14 are also contemplated. In one embodiment of the invention, the filter 14 is a basket-type filter. However, it should be understood that other types of filters are also contemplated as falling within the scope of the invention, such as, for example, filter bags.

The filter element 60 preferably has a tubular configuration defining a filter cavity 70 having a closed end (not shown) and an open end 72. In one embodiment of the invention, the filter element 60 is formed of a metallic material, such as, for example, stainless steel or carbon steel. However, other materials are also contemplated, such as, for example, plastic materials, synthetic or natural fiber materials, fabric materials, or any other type of filter media that would occur to one of skill in the art. In a specific embodiment of the invention, the filter element 60 is formed of a perforated sheet material defining a series of perforation openings having a diameter of approximately 0.14 inches. However, it should be understood that other shapes and sizes of perforation openings are also contemplated as falling within the scope of the invention. Moreover, other types of filter configurations are also contemplated, such as, for example, wire screens, sieves and/or other types of porous or perforated configurations.

Figure 5:
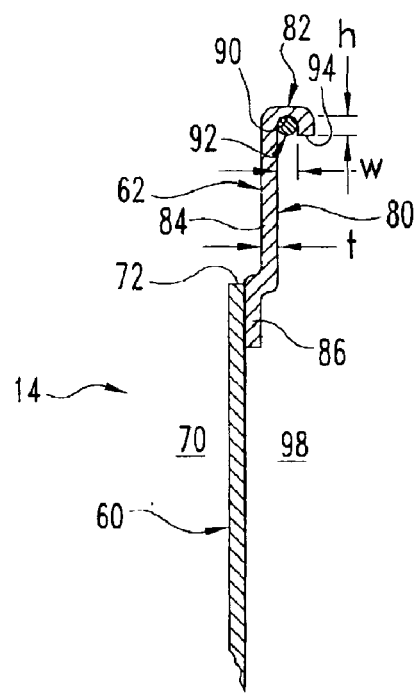
FIG. 5 is an enlarged view of a portion of the filter assembly shown in FIG. 4, illustrating a filter flange having a seal retaining feature according to one embodiment of the present invention.

The flange element 62 is operably attached to the filter element 60 adjacent the open end 72, such as, for example, by welding. However, other methods of attaching the flange element 62 to the filter element 60 are also contemplated as would occur to one of skill in the art, such as, for example, by fastening. Alternatively, the filter element 60 and the flange element 62 may be formed as a single-piece, unitary structure. The flange element 62 preferably extends entirely about the filter element 60 so as to define an annular configuration surrounding the open end 72. Referring to FIG. 5, the flange element 62 is generally comprised of an axially-extending collar portion 80 and a lip portion 82 extending from the collar portion 80. In one embodiment of the invention, the collar portion 80 includes a first axial section 84 and a second axial section 86. The second axial section 86 is inwardly offset from the first axial section 84, the purpose of which will be discussed below. In a preferred embodiment of the invention, the lip portion 82 has a hook-shaped configuration. The lip portion 82 defines an axially-facing inner groove 90 adapted to receive and securely retain a seal or gasket 92 therein. Preferably, the inner groove 90 extends entirely about the lip portion 82 so as to define an annular configuration. In one embodiment, the annular groove 90 has a semi-circular cross-section defining a groove width w and groove height h. However, other shapes and configurations of the groove 90 are also contemplated as falling within the scope of the present invention.

In one embodiment of the invention, the hook-shaped lip portion 82 is formed by bending or turning over the distal end portion of the axial collar 80 to thereby form the annular groove 90. In a specific embodiment, the distal end portion of the axial collar 80 is spun over to form the hook-shaped lip portion 82. This method of forming the annular groove 90 tends to be more cost effective than other machining or fabrication techniques and also tends to reduce the overall weight of the flange element 62. In order to accommodate formation of the hook-shaped lip portion 82, the flange element 62 is preferably formed of a sheet material having a thickness t that permits the spinning or turning of the lip portion 82, while still having sufficient strength to support the filter element 60. The flange element 62 is preferably formed of a metallic material, such as, for example, stainless steel or carbon steel. However, other materials are also contemplated, such as, for example, plastic materials including polypropylene, polyethylene, thermoplastic materials, or any other type of material that would occur to one of skill in the art.

In one embodiment of the invention, the seal 92 is an O-ring seal. However, other types and configurations of seals or gaskets are also contemplated for use in association with the present invention. The O-ring 92 may be formed of various types of resilient materials, such as, for example, VITON, Silicone, Neoprene, EPDM, or other types of seal or gasket materials know to those of skill in the art. The O-ring 92 preferably has a substantially circular cross-section defining an outer diameter. The width w of the annular groove 90 defined by the lip portion 82 is preferably sized somewhat less than the outer diameter of the O-ring 92. As a result, the hook-shaped lip portion 82 and/or the O-ring 92 must be slightly deformed in an elastically resilient manner to accommodate seating of the O-ring 92 within the annular groove 90. The O-ring 92 will thereby be securely seated and retained within the annular groove 90 so as to reduce the likelihood of inadvertent or unintentional removal or dislodgment from the flange element 62. The groove height h is also sized somewhat less than the outer diameter d of the O-ring 92 to allow a portion of the O-ring 92 to extend beyond the distal-most end 94 of the lip portion 82.

Figure 4:
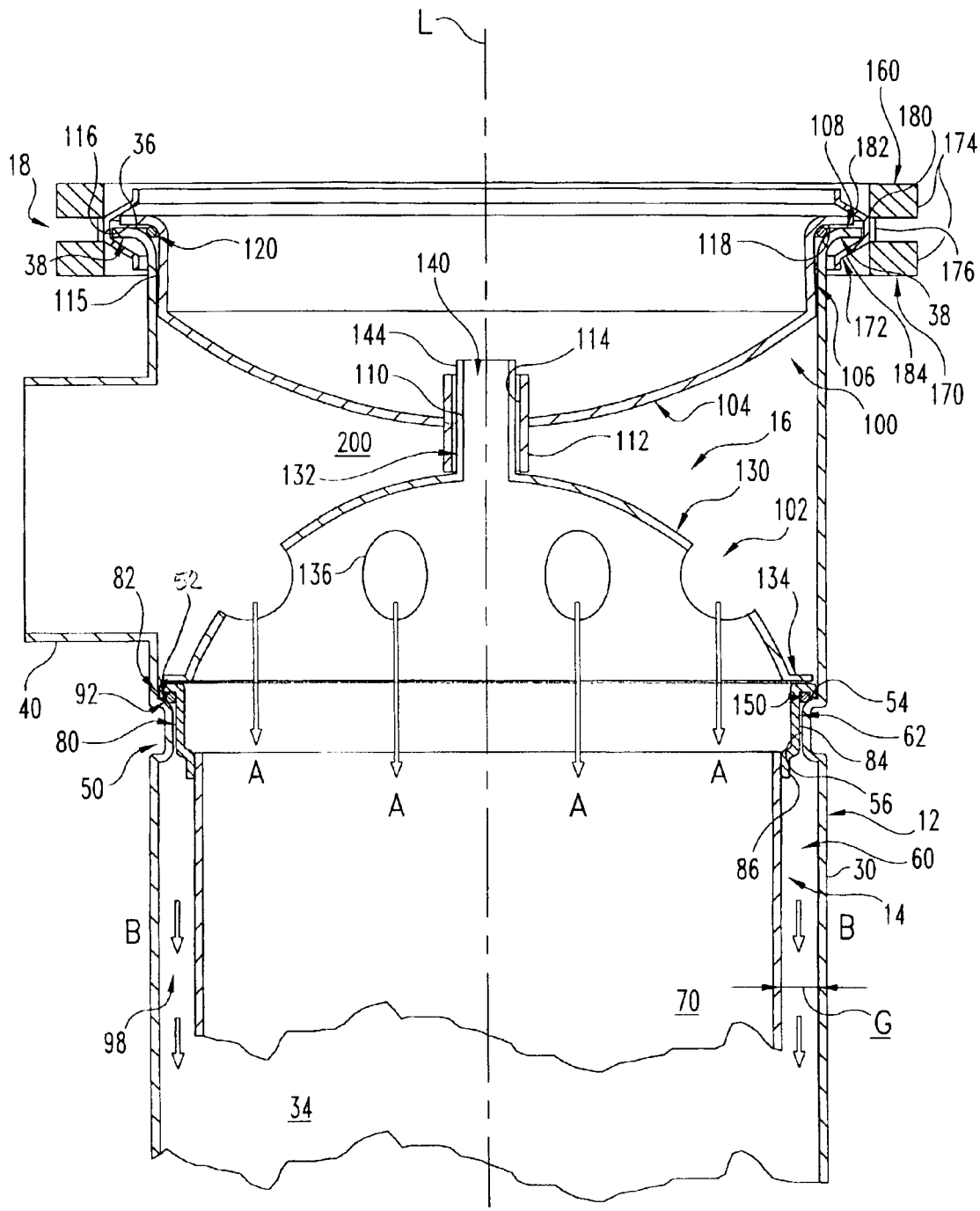
FIG. 4 is a cross-sectional view of the filter assembly shown in FIG. 1.

Referring to FIG. 4, the filter 14 is suspended within the interior chamber 34 of the filter housing 12 via engagement of the flange element 62 against the inward protrusion 50. More specifically, the O-ring 92 is seated within the annular groove 90 of the hook-shaped lip portion 82, which is in turn engaged against the annular sealing surface 54 of the shoulder 52 to thereby form a fluid-tight seal between the filter 14 and the filter housing 12. The first axial section 84 of the flange element 62 has an outer diameter sized in relatively close tolerance with the inner diameter of the axially-extending surface 56 formed by the protrusion 50 to facilitate proper positioning of the filter 14 relative to the filter housing 12. Specifically, the first axial section 84 cooperates with the axially-extending surface 56 to center the filter element 60 within the interior chamber 34 of the filter housing 12. As a result, a relatively uniform gap G is formed between the outer surface of the filter element 60 and the inner surface of the filter housing sidewall 30. The second axial section 86 of the flange 62 may be inwardly offset relative to the first axial section 84 to increase the size of the gap G. As should be apparent, the amount of offset between the first and second axial sections 84, 86 can be changed to correspondingly adjust the size of the gap G. As should also be apparent, the gap G between the filter element 60 and the filter housing sidewall 30 provides an annular passageway 98 that serves to direct filtered fluid flow exiting the filter element 60 toward the fluid outlet port 42.

In one embodiment of the invention, the filter housing cover assembly 16 is generally comprised of an upper lid portion 100 and a lower retainer portion 102. The filter housing cover assembly 16 preferably functions to seal off the open end 36 of the filter housing 12 and to retain the flange element 62 of the filter 14 in sealing engagement with the annular shoulder 52 defined by the filter housing sidewall 30, the details of which will be discussed below. The filter housing cover assembly 16 is preferably formed of a metallic material, such as, for example, stainless steel or carbon steel. However, other materials are also contemplated, such as, for example, plastic materials including polypropylene, polyethylene, thermoplastic materials, or any other type of material that would occur to one of skill in the art.

In one embodiment of the invention, the upper lid portion 100 has a pan-like configuration, including a bottom wall portion 104, an axially-extending sidewall portion 106, and a laterally-extending flange element 108 projecting outwardly from the sidewall portion 106. It should be understood, however, that other configurations of the lid portion 100 are also contemplated as falling within the scope of the present invention. In a specific embodiment of the invention, the bottom wall 104 has an inverted dome shape; however, other shapes and configurations are also contemplated, such as, for example, a flat configuration. An aperture 110 is defined through the bottom wall 104 and is preferably arranged at the approximate center of the bottom wall 104. A sleeve 112 defining an inner passageway 114 extends through the aperture 110 and is securely attached to the bottom wall 104, preferably by welding, to provide a fluid-tight seal between the bottom wall 104 and the sleeve 112. In one embodiment, the passageway 114 defines internal threads therethrough, the purpose of which will be discussed below. In an alternative embodiment, the sleeve 112 may define external threads. The sidewall 106 is preferably sized and shaped to correspond with the inner cross-section of the filter housing sidewall 30 adjacent the open end 36. In one embodiment of the invention, the sidewall 106 has an annular or collar-like configuration including an axially-extending outer surface 115 that preferably defines an inward taper extending from the bottom wall 104 toward the flange 108. The flange 108 preferably extends about the entire perimeter of the sidewall 106 so as to define a downwardly facing annular sealing surface 116. A corner 118 is formed between the sidewall 106 and the flange 108.

As discussed above, the outer surface 115 of the sidewall 106 preferably defines an inward taper. More specifically, the outer surface 115 is preferably arranged at a taper angle $\alpha$ (FIG. 6) so as to define a first diameter $D_1$ adjacent the bottom wall 104 and a second diameter $D_2$ adjacent the flange 108, with the first diameter $D_1$ being larger than the second diameter $D_2$. An annular seal or gasket 120 is disposed about the sidewall 106 adjacent the flange 108, preferably positioned in abutment against the corner 118 formed between the axial surface 115 of the sidewall 106 and the annular surface 116 of the flange 108. In one embodiment of the invention, the seal 120 is an O-ring seal. However, other types and configurations of seals or gaskets are also contemplated for use in association with the present invention. The O-ring 120 may be formed of various types of resilient materials, such as, for example, VITON, Silicone, Neoprene, EPDM, or other types of seal or gasket materials know to those of skill in the art.

The O-ring 120 preferably has an inner diameter that is substantially equal to or slightly less than the outer diameter $D_2$ of the sidewall 106. Positioning of the O-ring 120 about the sidewall 106 thereby requires that the O-ring 120 be stretched out or deformed in an elastically resilient manner to a size sufficient to pass or roll over the bottom portion of the sidewall 106 adjacent the bottom wall 104. Notably, the portion of the sidewall 106 adjacent the bottom wall 104 has a diameter $D_1$ that is sized somewhat larger than the undeformed inner diameter of the O-ring 120. When the O-ring 120 is positioned adjacent the corner 118, the O-ring 120 will reform back toward its original, undeformed configuration. The corner 118 is preferably rounded to provide a secure seating arrangement for the O-ring 120. Once the O-ring 120 is reformed back toward its original undeformed configuration, removal of the O-ring 120 from the sidewall 106 requires the O-ring 120 to be stretched out or deformed to a size equal to or greater than the outer diameter $D_1$ of the sidewall 106. The inward taper of the sidewall 106 therefore retains the O-ring 120 on the sidewall 106 to reduce the likelihood of the inadvertent or unintentional removal or dislodgment of the O-ring 120 from the upper lid portion 100 of the cover assembly 16.

In one embodiment of the invention, the taper angle $\alpha$ of the sidewall 106 falls within a range of about 1 degree to about 10 degrees. In a more specific embodiment, the taper angle $\alpha$ is approximately 3.5 degrees. However, it should be understood that other taper angles are also contemplated, including taper angles less than 1 degree and greater than 10 degrees. In another embodiment of the invention, the difference $\Delta$ between the first diameter $D_1$ and the second diameter $D_2$ falls within a range of about 0.015 inches to about 0.125 inches. In a more specific embodiment, the difference $\Delta$ between the first diameter $D_1$ and the second diameter $D_2$ is approximately 0.05 inches. However, it should be understood that the difference $\Delta$ between the first diameter $D_1$ and the second diameter $D_2$ may be less than 0.015 inches or greater than 0.125 inches.

In one embodiment of the invention, the lower retainer portion 102 of the filter housing cover assembly 16 has a dome-like configuration, including a rounded wall portion 130, a nipple 132 extending axially from the rounded wall 130, and a laterally-extending flange element 134 projecting outwardly from the outer perimeter of the rounded wall 130. It should be understood, however, that other configurations of the retainer portion 102 of the cover assembly 16 are also contemplated as falling within the scope of the present invention.

In a specific embodiment of the invention, the rounded wall 130 has a dome shape; however, other shapes and configurations are also contemplated as falling within the scope of the invention. A number of openings 136 are defined through the rounded wall 130, the purpose of which will be discussed below. The openings 136 are preferably spaced uniformly about the center wall 130 relative to the nipple 132. In a specific embodiment, the wall 130 defines six (6) openings 136, with each opening 136 being uniformly separated by an angle of about 60 degrees. In another specific embodiment of the invention, each opening 136 has a diameter of about one inch. It should be understood, however, that other configurations and arrangements of the openings 136 are also contemplated as falling within the scope of the invention. In one embodiment of the invention, the nipple 132 has a cylindrical shape and defines an inner passageway 140. The nipple 132 extends through the domed wall 130 and is securely attached to the wall 130, preferably by welding. In one embodiment of the invention, at least an upper portion of the nipple 132 defines external threads 144, the purpose of which will be discussed below. However, it should be understood that in an alternative embodiment, the nipple 132 may define internal threads.

Figure 6:
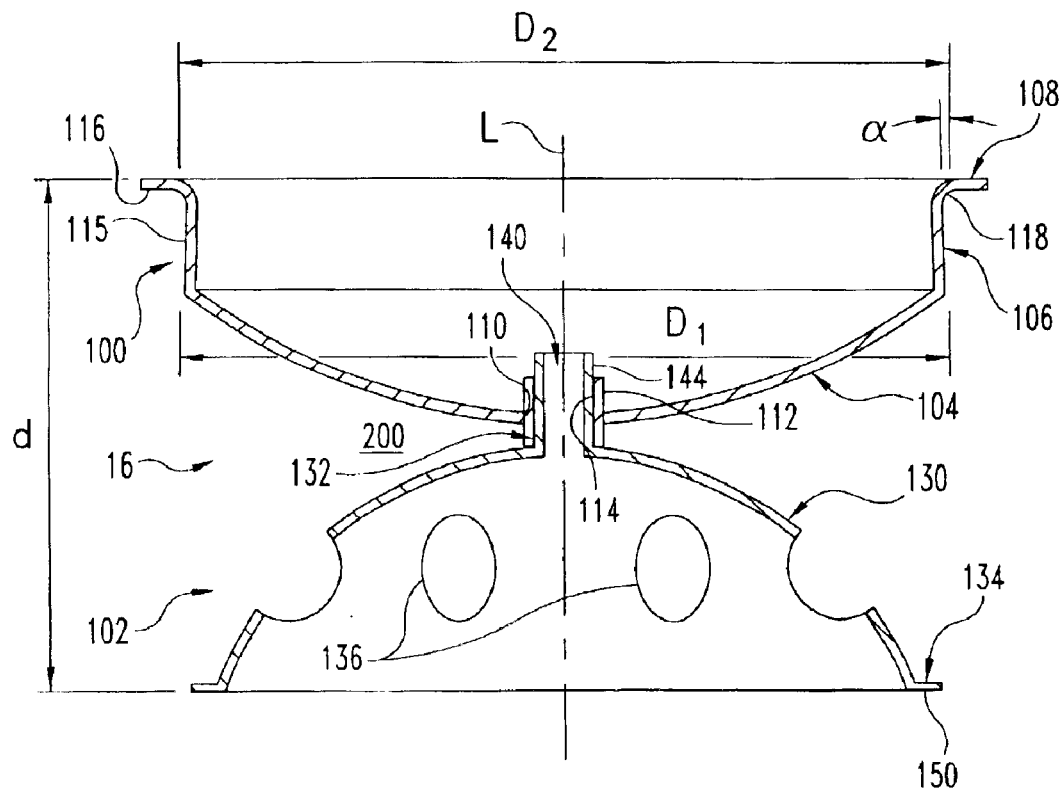
FIG. 6 is an enlarged view of a portion of the filter assembly shown in FIG. 4, illustrating a filter housing cover having a seal retaining feature according to one embodiment of the present invention.

The lower retainer portion 102 is coupled to the upper lid portion 100 by threadedly engaging the external threads 144 of the nipple 132 with the internal threads 114 of the sleeve 112. Such threaded engagement interconnects the nipple 132 to the sleeve 112 in a fluid-tight manner, with the passageway 140 of the nipple 132 disposed in fluid communication with the passageway 114 of the sleeve 112. As shown in FIG. 6, the upper flange 108 defined by the lid portion 100 is separated from the lower flange 134 defined by the retainer portion 102 by a distance d. As should be apparent, the distance d may be adjusted by threading the nipple 132 into or out of the sleeve 112, the purpose of which will be discussed below. Although the lid portion 100 and the retainer portion 102 have been illustrated and described as comprising separate structures that are adjustably coupled to one another to define an integral structure, it should be understood that the lid portion 100 and the retainer portion 102 may alternatively be formed as a non-adjustable two-piece structure or as a single-piece, unitary structure.

The outwardly extending flange 134 of the retainer portion 102 preferably extends about the entire perimeter of the rounded wall 130 so as to define a downwardly-facing annular bearing surface 150. The outer diameter of the flange 134 is preferably sized slightly less than the inner diameter of the filter housing sidewall 30. As shown in FIG. 4, the annular bearing surface 150 of the flange 134 is engageable against the upper surface of the hook-shaped lip 82 of the filter 14. The O-ring 92 seated within the hook-shaped lip 82 is in turn sealingly engaged against the annular sealing surface 54 of the shoulder 52 to form a fluid-tight seal between the flange portion 62 of the filter 14 and the protrusion 50 of the filter housing 12. The relatively large area of engagement of the bearing surface 150 in contact with the outer surface of the hook-shaped lip 82 provides a substantially uniform downward force onto the entire O-ring 92, which in turn provides substantially uniform sealing engagement between the O-ring 92 and the annular sealing surface 54 of the shoulder 52.

The filter housing cover assembly 16 is removably secured to the filter housing 12 via the clamp device 18. In one embodiment of the invention, the clamp device 18 is a band-type clamp having an annular band portion 160 and a tightening/release mechanism 162. The annular band portion 160 is adapted to engage each of the annular flanges 38, 108 of the filter housing 12 and the filter housing cover 16 to draw the flanges 38, 108 together. The tightening/release mechanism 162 engages opposite end portions 164a, 164b of the annular band 160 and is operable to draw the end portions 164a, 164b together to tension the band 160 in such a manner as to securely attach the cover assembly 16 to the filter housing 12. Likewise, the tightening/release mechanism 162 is operable to permit the end portions 164a, 164b to become spaced apart to relieve the tension in the band 160 in such a manner as to permit removal of the cover assembly 16 from the filter housing 12.

In one embodiment of the invention, the annular band portion 160 comprises an outer support member 170 and an inner wedge clamp member 172. The outer support member 170 is comprised of a pair of support block portions 174 interconnected by a central web portion 176. The wedge clamp 172 includes a central base portion 180 attached to the web portion 176 of the outer support 170, and a pair of oppositely disposed flange elements 182, 184 extending from the base portion 180. The pair of flanges 182, 184 are disposed in an angular relationship relative to one another so as to define a V-shaped channel 186 therebetween that tapers outwardly relative to the base portion 180. In one embodiment, the annular band 160 is formed of a material that is capable of being reformed from an untightened configuration to a tightened configuration, yet sufficiently strong to withstand the tension forces associated with tightening of the clamp device 18. In one embodiment, the annular band portion 160 is formed of a metallic material, such as, for example, stainless steel or carbon steel. However, other materials may also be used, including other metallic materials, a plastic material, or any other material that would occur to one of skill in the art.

In one embodiment of the invention, the tightening/release mechanism 162 includes a T-handle 190 having a stem portion 192. The stem portion 192 is engaged between a coupling device 194 attached to the first end portion 164a of the band 160 and a connector block 196 attached to the opposite end portion 164b of the band 160. As should be apparent, rotation of the T-handle 190 in one direction will tighten the band 160, while rotation of the T-handle 190 in the opposite direction will loosen the band 160. The tightening/release mechanism 162 is also preferably equipped with a quick-release mechanism 198 that permits the tension in the band 160 to be quickly released to allow quick and efficient removal and reinstallation of the clamp device 18.

An example of a clamp device 18 suitable for use with the present invention is manufactured by Clampco Products, Inc. of Wadsworth, Ohio under Part No. V02-3-62-00-N-0812-T. Although a specific embodiment of a clamp device 18 has been illustrated and described herein, it should be understood that other types of clamp devices may be used to removably secure the cover assembly 16 to the filter housing 12. For example, other configurations of clamps may be used, including various types of C-clamps. Alternatively a plurality of fasteners may be used to removable secure the cover assembly 16 to the filter housing 12, including the use of various types of threaded fasteners such as bolts, studs or screws.

The band portion 160 is initially disposed about the filter housing 12 while in a loosened configuration, with the annular flanges 38, 108 of the filter housing 12 and the cover assembly 16 positioned within the V-shaped channel 186 defined by the wedge clamp 172. The annular band 160 is made taught by actuating the tightening mechanism 162, which in turn constricts the annular band 160 about the annular flanges 38, 108. Inward constriction of the annular band 160 engages the angled flanges 182, 184 of the wedge clamp 172 against the annular flanges 38, 108, which in turn results in the annular flanges 38, 108 being drawn together.

As should be appreciated, as the annular flanges 38, 108 are drawn together, the O-ring 120 disposed about the sidewall 106 of the lid portion 100 will sealingly engage the annular sealing surface 39 of the filter housing flange and the annular sealing surface 116 of the lid flange 108 to thereby form a fluid-tight seal therebetween. As should also be appreciated, as the annular flanges 38, 108 are drawn together, the downwardly-facing annular bearing surface 150 of the hold down flange 134 will engage the outer surface of the hook-shaped lip 82 of the filter 14. The O-ring 92 seated within the hook-shaped lip 82 is in turn sealingly engaged against the annular sealing surface 54 of the interior filter housing shoulder 52 to form a fluid-tight seal therebetween. As discussed above, the distance d separating the annular flanges 108, 134 of the upper lid portion 100 and the lower retainer portion 102 is adjustable via threading the nipple 132 further into or further out of the sleeve 112. As should be appreciated, adjusting the distance d between the flanges 108, 134 correspondingly adjusts the downward force exerted by the annular flange 134 onto the outer surface of the hook-shaped lip 82 of the filter 14. Adjustment of the downward force exerted onto the hook-shaped lip 82 in turn adjusts the sealing force between the O-ring 92 and the annular sealing surface 54.

In one embodiment of the invention, a pressure relieve device (not shown), such as, for example, a manual on/off valve or an automatic pressure relief valve, may be threadedly engaged to the sleeve 132 of filter housing cover 16. Inclusion of such a device provides a means for relieving fluid pressure from the interior chamber 34 of the filter housing 12. In another embodiment, a pressure gauge (not shown) may be threadedly engaged to the sleeve 132 to provide a means for indicating fluid pressure within the interior chamber 34 of the filter housing 12. Alternatively, a threaded plug or cap (not shown) may be threadedly engaged to the sleeve 132 to seal off the sleeve 132 when not in use.

As shown in FIG. 4, when the filter assembly 10 is in operation, unfiltered fluid is directed into the filter housing 12 via the fluid inlet port 40. Notably, the inlet port 40 is disposed between the bottom wall 104 of the lid portion 100 and the upwardly-facing annular surface 54 defined by the interior shoulder 50 of the filter housing 12. In this manner, fluid entering the filter housing 12 and is directed into a cavity 200 between the bottom wall 104 of the lid portion 100 and the top wall 130 of the retainer portion 102. The fluid is then directed through the openings 136 in the top wall 130 of the retainer portion 102 and into the open end 72 of the filter element 60 in the direction of the arrows A. The uniform positioning of the openings 136 in the top wall 130 facilitates uniform fluid flow through the filter element 60. The fluid is then filtered via passage through the perforation openings in the filter element 60, with foreign material or debris being trapped or captured within the filter cavity 70. The filtered fluid is then directed along the gap G between the filter element 60 and the inner wall of the filter housing 12 in the direction of arrows B. The filtered fluid is then discharged from the filter housing 12 via the fluid outlet port 42.

As discussed above, the filter 14 must be periodically inspected, cleaned and/or replaced to ensure proper functioning of the filter assembly 10. Fluid flow to the filter housing 12 is either shut-off or is placed in a by-pass mode around the filter housing 12. The filter housing cover assembly 16 is removed from the filter housing 12 to provide access to the filter 14. Notably, since the O-ring 120 is securely retained on the lid portion 100 of the cover 16 via the tapered configuration of the lid cover sidewall 106, the risk of inadvertent or unintentional separation or dislodgment of the O-ring 120 from the filter housing cover assembly 16 is significantly reduced. Following removal of the cover assembly 16, the filter 14 may be removed from the interior chamber 34 of the filter housing 12. Once again, since the O-ring 92 is securely seated within the U-shaped groove 90 defined by the hook-shaped lip 82 of the filter flange 62, the risk of inadvertent or unintentional separation or dislodgment of the O-ring 92 from the filter 14 is significantly reduced.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A filter assembly, comprising:
   a filter housing defining an interior chamber extending along an axis and having an open end, said filter housing defining an annular sealing surface facing an axial direction, said sealing surface defined by a protrusion extending inwardly into said interior chamber and being spaced from said open end of said filter housing;
   a fluid inlet and a fluid outlet in communication with said interior chamber of said filter housing;
   a filter disposed within said interior chamber of said filter housing and including a filter element and a flange element, said flange element having a distal end portion that is turned over to form a hook-shaped lip portion defining a groove facing an axial direction when said filter is disposed within said interior chamber of said filter housing;
   a seal retained within said groove of said hook-shaped lip portion with a portion of said seal extending beyond a distal-most end of said hook-shaped lip portion for sealing engagement with said annular sealing surface of said filter housing; and
   a cover removably positioned over said open end of said filter housing to enclose said interior chamber.

2. The filter assembly of claim 1, wherein said flange element is fabricated from a sheet material.

3. The filter assembly of claim 1, wherein said seal comprises an O-ring having an outer diameter, said groove having a groove width less than said outer diameter of said O-ring.

4. The filter assembly of claim 1, wherein said interior chamber of said filter housing is bound by a sidewall, said protrusion being formed by an inwardly deformed portion of said sidewall.

5. The filter assembly of claim 1, wherein said protrusion defines an axially-extending bearing surface, said flange element including an axially-extending collar portion cooperating with said axially-extending bearing surface to position said filter element within said interior chamber to form a substantially uniform gap between said filter element and said filter housing.

6. The filter assembly of claim 5, wherein said collar portion includes a first axial section and a second axial section inwardly offset relative to said first axial section, said first axial section cooperating with said axially-extending bearing surface of said protrusion, said second axial section being operably attached to said filter element.

7. The filter assembly of claim 1, wherein said cover includes a lid portion and a retainer portion, said lid portion adapted to sealingly engage said open end of said filter housing to enclose said interior chamber, said retainer portion adapted to engage said hook-shaped lip portion of said flange element to sealingly engage said seal against said sealing surface of said filter housing.

8. The filter assembly of claim 7, wherein said cover has an axial dimension, said retainer portion being movably coupled to said lid portion to provide adjustment of said axial dimension.

9. The filter assembly of claim 8, wherein said retainer portion is threadedly coupled to said lid portion.

10. The filter assembly of claim 1, further comprising an O-ring seal adapted for sealing engagement between said cover and said open end of said filter housing; and
    wherein said cover includes an axially-extending sidewall portion and a laterally-extending flange portion extending outwardly from said sidewall portion, said sidewall portion defining an outward taper relative to said flange portion, said O-ring seal positioned about said sidewall portion adjacent said flange portion and being retained on said sidewall portion by said outward taper.

11. The filter assembly of claim 1, wherein said filter housing includes an inlet port disposed in fluid communication with said interior chamber and positioned between said open end and said sealing surface.

12. A filter assembly, comprising:
    a filter housing defining an interior chamber extending along an axis and having an open end;
    a fluid inlet and a fluid outlet in communication with said interior chamber of said filter housing;
    a filter disposed within said interior chamber of said filter housing;
    a cover removably positioned over said open end of said filter housing to enclose said interior chamber, said cover including a lid portion having an axially-extending sidewall portion and a laterally-extending flange portion extending outwardly from said sidewall portion, said sidewall portion defining an outward taper relative to said flange portion; and
    a seal adapted for sealing engagement between said laterally-extending flange portion and said open end of said filter housing, said seal positioned about said sidewall portion and being retained thereon by said outward taper.

13. The filter assembly of claim 12, wherein said filter housing defines a sealing surface facing an axial direction and axially spaced from said open end, said filter including a filter element and a flange element, said cover including a retainer portion adapted to maintain said flange element in sealing engagement with said sealing surface of said filter housing.

14. The filter assembly of claim 13, wherein said retainer portion defines an annular bearing surface adapted to engage said flange element to maintain said flange element in sealing engagement with said sealing surface of said filter housing.

15. The filter assembly of claim 13, wherein said flange element includes a hook-shaped lip portion defining a groove facing an axial direction when said filter is disposed within said interior chamber of said filter housing, said groove adapted to securely retain an O-ring seal therein.

16. The filter assembly of claim 15, wherein said flange element is fabricated from a sheet material, said hook-shaped lip portion being formed by turning over a distal end portion of said flange element.

17. The filter assembly of claim 13, wherein said cover has an axial dimension, said retainer portion being movably coupled to said lid portion to provide adjustment of said axial dimension.

18. The filter assembly of claim 17, wherein said retainer portion is threadedly coupled to said lid portion.

19. The filter assembly of claim 18, wherein one of said lid portion and said retainer portion includes an internally threaded sleeve, another of said lid portion and said retainer portion including an externally threaded nipple, said nipple threadedly engaging said sleeve to adjustably couple said lid portion to said retainer portion.

20. The filter assembly of claim 19, further comprising a pressure relief device; and wherein said nipple and said sleeve cooperate to define a passageway in fluid communication with said interior chamber of said filter housing, said pressure relief device disposed in fluid communication with said passageway and adapted to selectively relieve pressure from said interior chamber.

21. The filter assembly of claim 13, wherein said interior chamber of said filter housing is bound by a sidewall, a portion of said sidewall being inwardly deformed to form a protrusion extending into said interior chamber, said protrusion defining said sealing surface of said filter housing.

22. The filter assembly of claim 21, wherein said inwardly deformed portion of said sidewall is C-shaped.

23. The filter assembly of claim 13, further comprising a clamp adapted to exert a biasing force onto said lid portion to provide said sealing engagement between said laterally-extending flange portion and said open end of said filter housing, said lid portion cooperating with said retainer portion to exert a biasing force onto said flange element to maintain said sealing engagement with said sealing surface of said filter housing.

24. The filter assembly of claim 13, wherein said lid portion includes a first wall facing an axial direction, said retainer portion including a second wall facing an axial direction and spaced from said first wall to define a cavity therebetween, said fluid inlet of said filter housing arranged to direct fluid into said cavity between said first wall of said lid portion and said second wall of said retainer portion.

25. The filter assembly of claim 24, wherein said second wall defines a number of openings for directing fluid flow into said filter element.

26. The filter assembly of claim 24, wherein each of said first and second walls are dome-shaped.

27. A filter assembly, comprising:
a filter housing defining an interior chamber extending along an axis, said filter housing having an open end and an annular sealing surface facing an axial direction and axially spaced from said open end;
a fluid inlet and a fluid outlet in communication with said interior chamber of said filter housing;
a filter disposed within said interior chamber of said filter housing and including a filter element and an annular flange element extending about said filter element;
a first seal disposed between said annular flange element of said filter and said annular sealing surface of said filter housing;
a cover removably positioned over said open end of said filter housing to enclose said interior chamber, said cover including a lid portion and a retainer portion, said lid portion coupled to said retainer portion, said retainer portion defining an annular bearing surface;
a second seal disposed between said lid portion and said open end of said filter housing; and
a clamp adapted to exert a biasing force onto said lid portion to provide sealing engagement between said lid portion and said open end of said filter housing, said lid portion cooperating with said retainer portion to engage said annular bearing surface against said annular flange element of said filter to provide sealing engagement between said annular flange element of said filter and said annular sealing surface of said filter housing.

28. The filter assembly of claim 27, wherein said cover has an axial dimension, said lid portion being movably coupled to said retainer portion to provide adjustment of said axial dimension.

29. The filter assembly of claim 28, wherein said lid portion is threadedly coupled to said retainer portion to provide adjustment of said axial dimension.

30. The filter assembly of claim 29, wherein one of said lid portion and said retainer portion includes an internally threaded sleeve, another of said lid portion and said retainer portion including an externally threaded nipple, said nipple threadedly engaging said sleeve to adjustably couple said lid portion to said retainer portion.

31. The filter assembly of claim 33, further comprising a pressure relief device; and wherein said nipple and said sleeve cooperate to define a passageway in fluid communication with said interior chamber of said filter housing, said pressure relief device disposed in fluid communication with said passageway and adapted to selectively relieve pressure from said interior chamber.

32. The filter assembly of claim 27, wherein said annular flange element has a hook-shaped lip portion defining a groove facing an axial direction when said filter is disposed within said interior chamber of said filter housing, said first seal being securely retained within said groove.

33. The filter assembly of claim 27, wherein said lid portion includes an axially-extending sidewall portion and a laterally-extending flange portion extending outwardly from said sidewall portion, said sidewall portion defining an outward taper relative to said flange portion, said second seal positioned about said sidewall portion and being retained thereon by said outward taper.

34. The filter assembly of claim 27, wherein said first and second seals are O-rings.

35. A filter assembly, comprising:
a filter housing defining an interior chamber extending along an axis, said filter housing having an open end and an annular sealing surface facing an axial direction and axially spaced from said open end;
a fluid inlet and a fluid outlet in communication with said interior chamber of said filter housing;

a filter disposed within said interior chamber of said filter housing and including a filter element and an annular flange element extending about said filter element;

a first seal disposed between said annular flange element of said filter and said annular sealing surface of said filter housing;

a cover removably positioned over said open end of said filter housing to enclose said interior chamber, said cover including a lid portion and a retainer portion, said lid portion including an axially-extending sidewall portion and a laterally-extending flange portion extending outwardly from said sidewall portion, said axially-extending sidewall portion positioned within said interior chamber of said filter housing and engaged with said retainer portion, said retainer portion defining an annular bearing surface;

a second seal disposed between said laterally-extending flange portion of said lid portion and said open end of said filter housing; and a clamp adapted to exert a biasing force onto said lid portion to provide sealing engagement between said lid portion and said open end of said filter housing, said lid portion cooperating with said retainer portion to engage said annular bearing surface against said annular flange element of said filter to provide sealing engagement between said annular flange element of said filter and said annular sealing surface of said filter housing.

36. The filter assembly of claim 35, wherein said lid portion is coupled to said retainer portion.

37. The filter assembly of claim 35, wherein said sidewall portion of said lid portion defines an outward taper relative to said flange portion, said second seal positioned about said sidewall portion and being retained thereon by said outward taper.

* * * * *